Aug. 9, 1966  M. DANGAUTHIER  3,264,971
AIR SUPPLY NOZZLE OF UTILITY IN PARTICULAR
FOR THE AERATION OR HEATING OF VEHICLES
Filed May 14, 1964  2 Sheets-Sheet 1
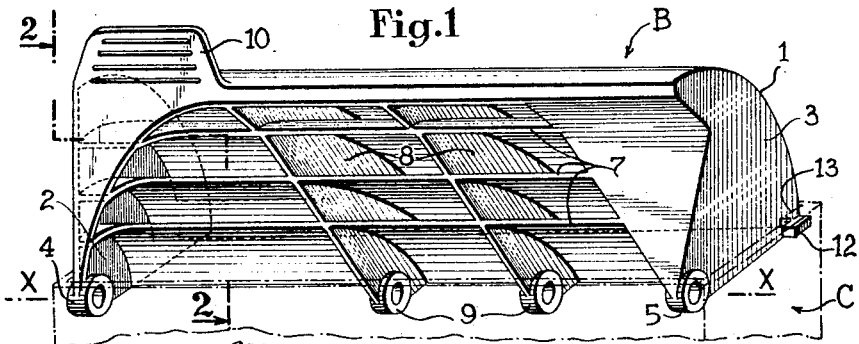
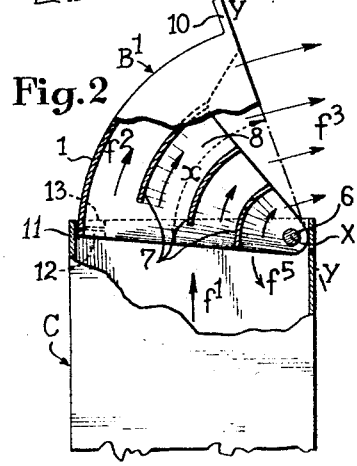
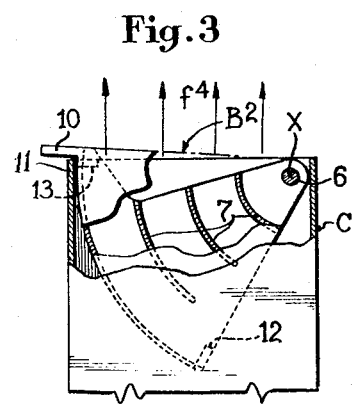
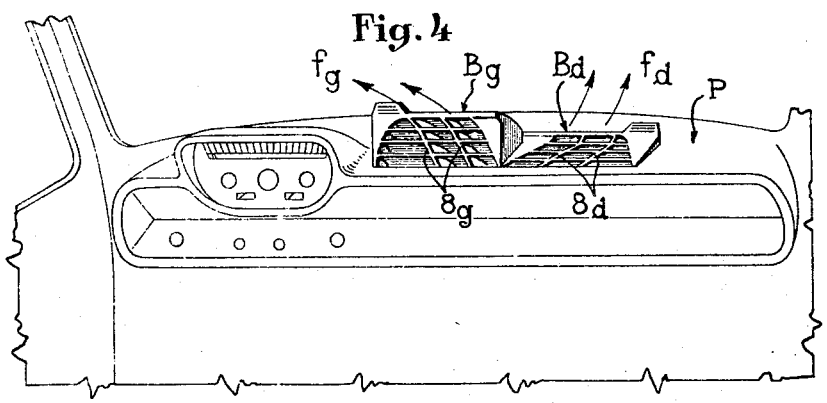
INVENTOR
MARCEL DANGAUTHIER
BY LeBlanc + Shur
ATTORNEYS Aug. 9, 1966  M. DANGAUTHIER  3,264,971
AIR SUPPLY NOZZLE OF UTILITY IN PARTICULAR
FOR THE AERATION OR HEATING OF VEHICLES
Filed May 14, 1964  2 Sheets-Sheet 2
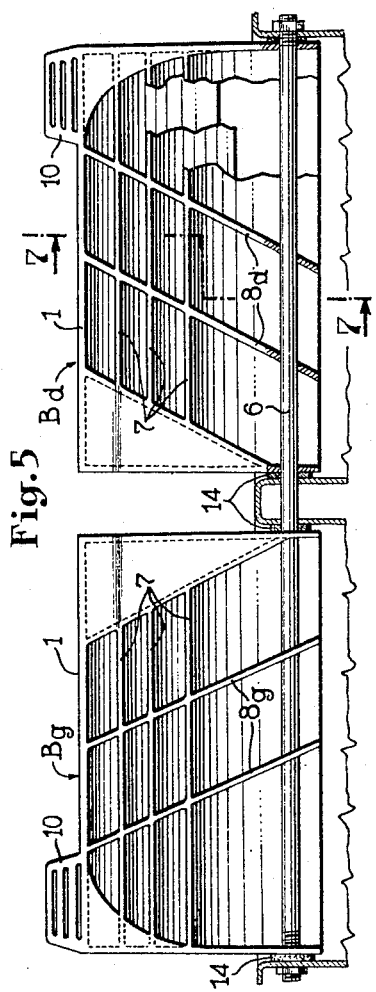
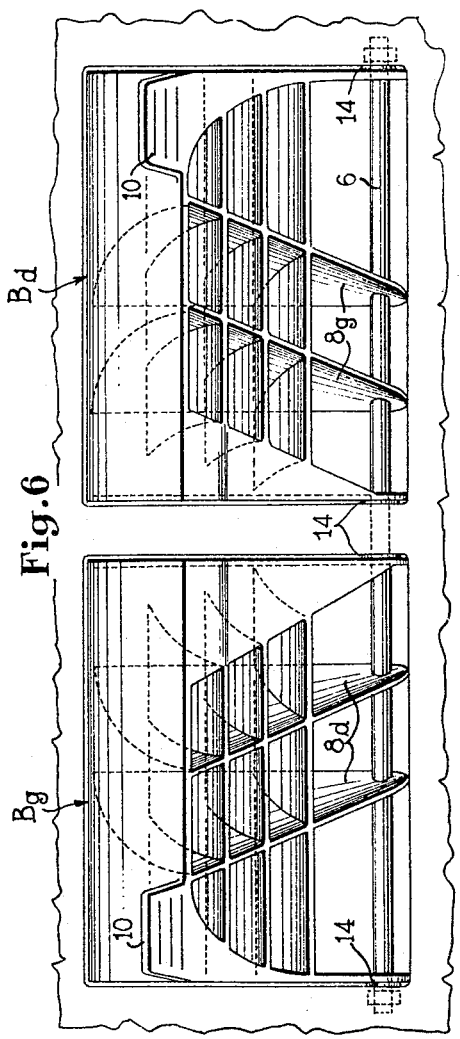
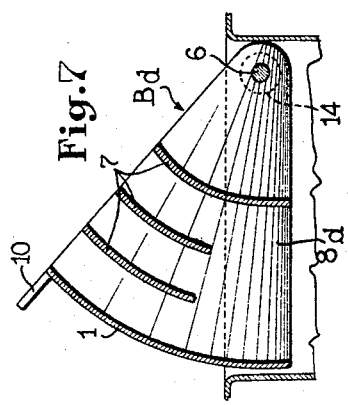
INVENTOR
MARCEL DANGAUTHIER
BY LeBlanc+Shur
ATTORNEYS

United States Patent Office 3,264,971
Patented August 9, 1966

3,264,971
AIR SUPPLY NOZZLE OF UTILITY IN PARTICULAR FOR THE AERATION OR HEATING OF VEHICLES
Marcel Dangauthier, Paris, France, assignor to Societe d'Etudes et d'Applications Industrielles Commerciales et Immobilieres "Inter-Technique," Paris, France, a French body corporate
Filed May 14, 1964, Ser. No. 367,374
Claims priority, application France, May 28, 1963, 936,232
7 Claims. (Cl. 98—2)

The present invention relates to the supply, in particular on board a motor vehicle, of conditioning air, namely either fresh air or hot heating air.

If it is desired to aerate or heat a vehicle by means of an air supply conduit opening onto, for example, the dashboard, it must be possible at the outlet of this conduit to direct as desired, the flux of air in different directions, for example for refreshing the face of the passenger or passengers seated in the forward part of the vehicle or the driver, or for preventing the formation of mist on the windscreen or for diminishing the internal temperature of the vehicle without creating the sensation of draft.

A fixed supply grill does not allow directing the jet of air which issues in a direction perpendicular to the section of the conduit. Circular grills having inclined fins which are pivotable about their axes can be employed for this purpose, but if there is only one air conduit available whose rectangular section has a width much greater than its thickness, it is only possible to mount circular grills of small diameter in consequently a rather large number. The device then becomes rather expensive.

The object of the invention is to avoid this drawback.

The invention provides an air supply nozzle for air conditioning (aerating and/or heating) for a motor vehicle or other applications, which comprises a part-cylindrical hood pivotally mounted on the end of the air conduit, within which said hood can be withdrawn by a pivotal motion or out of which the hood can be made to project a given amount so as to vary the direction of the air issuing from the conduit between two extreme directions which make therebetween an angle equal to the amplitude of pivotal motion of the hood.

Preferably, in order to direct the air flux in a more precise manner there are provided curved fins or blades which are concentric with the hood and are adapted to divide the current of air issuing from the nozzle into a series of thinner sheets of air which are oriented in an improved manner.

According to another feature, for the purpose of diverging the air in a direction which is inclined with respect to the pivot axis of the hood, there is provided at least one fixed oblique deflector which is connected to the hood and/or curved blades for laterally deflecting the air in the desired direction, that is, toward the driver or the passenger or passengers located in the front part of the vehicle in the case of an aerating device mounted in the centre of the dashboard of the motor vehicle.

Another object of the invention is to provide the arrangement of one or a plurality of air supply nozzles on a motor vehicle, for example two nozzles disposed side by side on the dashboard, one nozzle directing the air toward the driver and the other toward the forward passenger or passengers.

Further features and advantages of the invention will be apparent from the ensuing description with reference to the accompanying drawings to which the invention is in no way limited.

In the drawing:

FIG. 1 is a perspective view of air supply nozzle improved in accordance with the invention;

FIG. 2 is a vertical cross-sectional view taken along line 2—2 of FIG. 1;

FIG. 3 is an end elevational view of the air nozzle in its closed position within the air conduit;

FIG. 4 is a perspective view of the equipment of a dashboard of a motor vehicle with two air supply nozzles according to the invention;

FIG. 5 is a front elevational view, with parts cut away, of the last-mentioned two air nozzles;

FIG. 6 is a corresponding plan view thereof, and

FIG. 7 is a vertical cross-sectional view taken along line 7—7 of FIG. 5.

In the embodiment shown in FIGS. 1–3, the air supply nozzle B is adapted to be placed in the outlet end of a conduit C having a rectangular cross-sectional shape through which flows aerating or heating air in the direction of arrow $f^1$ (FIG. 2).

The outlet B is disposed in the outlet end of the conduit C. It comprises a part-cylindrical hood 1 having a part-circular section and an axis X—X, the angle $x$ subtended at the centre by the arc being preferably between 60 and 90°, although it must be understood that the invention is not intended to be limited to these values.

This part-cylindrical wall 1 is integral with two end side walls 2 and 3 in which bosses 4 and 5 form two pivot bearings for the pivotal mounting of the hood on a shaft 6 carried by the conduit C (FIGS. 2 and 3).

The side walls 2 and 3 carry a number of curved fins 7 which are concentric with the axis X—X and with the wall 1.

Two plane walls 8 forming deflectors which are disposed obliquely relative to the generatrices of the hood 1 and fins 7 and consequently relative to the axis X—X, are also provided. Advantageously, these deflectors 8 can comprise pivot bearings 9 which are in axial alignment on the axis X—X with the bearings 4 and 5.

The assembly just described is completed by firstly, a lug 10 forming a lever which permits the air supply nozzle assembly to be pivoted from a deployed position $B^1$ shown in FIG. 2 to a withdrawn position $B^2$ shown in FIG. 3 and, secondly, abutment means controlling these two extreme positions. These means comprise, in respect of the position $B^2$, the lug 10 which encounters the upper edge 11 of the conduit C (FIG. 3), and in respect of the position $B^1$ shown in FIG. 2, a small projection 12 provided on one of the side walls for example the wall 3 (see FIG. 1), this projection encountering an associated abutment 13 provided on the wall of the conduit C.

It will be understood that when the nozzle is raised to the position $B^1$ shown in FIG. 2 the flux of air flowing through the conduit C in the direction of arrow $f^1$ is deflected by the part-cylindrical hood 1 and the fins 7 in the direction of arrows $f^2$ and finally issues from the nozzle in a series of thin sheets parallel with the arrows $f^3$ which are in a direction, if not horizontal, at least in the neighbourhood of this direction, depending on the magnitude of the angle $x$ subtended at the centre by the hood 1. Further, the direction $f^3$ of the sheets or streams of air is not perpendicular to the outlet plane Y—Y (FIG. 2) of the nozzle but slightly inclined to this plane in the left direction as viewed in FIG. 1 owing to the presence of the deflecting walls 8.

When the nozzle is withdrawn to the position $B_2$ shown in FIG. 3 the thin sheets of air issue in the direction of the arrow $f^4$ in vertical planes, and toward the left as viewed in FIG. 1, owing to the effect of the walls 8. It will be understood that the air supply nozzle can be given any intermediate position between the two extreme positions $B^1$ and $B^2$.

FIGS. 4–7 show an arrangement of symmetrical nozzles, namely a left nozzle $B_g$ and a right nozzle $B_d$ mounted on the dashboard P of the vehicle, the left nozzle $B_g$ having its deflecting walls $8_g$ oriented as in the embodiment shown in FIGS. 1–3 in such manner that the streams of air issue in the direction of arrows $f_g$ and are deflected toward the driver in a more or less upward direction, depending on the orientation of the nozzle $B_g$.

As concerns the right nozzle $B_d$, the deflecting walls $8_d$ have the opposite orientation so that the streams of air are oriented more or less upwardly but toward the right as viewed in FIG. 4 in the direction of arrows $f_d$.

The two nozzles can be pivotally mounted on the same shaft 6 as seen in FIGS. 5–7 and each of them can be restrained or braked in its pivotal movements by elastically yieldable washers, such as 14.

Certain advantages of the device according to the invention will be clear from the foregoing. However they will be mentioned once more.

The device can be used directly at the outlet of an air conduit having a long and narrow rectangular cross-sectional shape.

The jet of air can be varied in orientation between two extreme directions which are divergent at a large angle which can be as much as about 90°.

In the case of a shock on the vehicle, the nozzle is immediately withdrawn by the effect of inertia in pivoting about the axis X—X in the direction of arrow $f^5$ (FIG. 2) so that in returning to the position shown in FIG. 3 there are no longer any projecting parts.

In the particular case of the use of two nozzles mounted as shown in FIGS. 4–7 on the upper part of the dashboard P of a vehicle, the two nozzles enable a high speed jet of fresh air to be directed onto the windscreen which facilitates the demisting of the latter on the sole condition that these nozzles are withdrawable completely into the air supply conduits as shown for the right nozzle $B_d$. As can be seen, the streams of air $f_d$ are forwardly and upwardly oriented and in this position of the nozzle the section of the passages of air formed in the conduit are reduced owing to the presence of the nozzle in this conduit; consequently the speed of the air is increased accordingly.

It is possible to give any angular position to the air in the vertical plane and consequently a suitable orientation regardless of the size of the passenger and the distance between the latter and the dashboard.

The two nozzles $B_g$ and $B_d$ can be coupled without loosing therebetween a part of the cross section of the air conduit common to these two nozzles.

Although specific embodiments of the invention have been described, many modifications and changes may be made therein without departing from the scope of the invention as defined in the appended claims.

Having now described my invention what I claim as new and desire to secure by Letters Patent is:

1. A conditioning air supply nozzle assembly comprising, an air supply conduit having an open outlet end, a substantially part-cylindrical hood, having a radius equal to one of the sides of the cross-section of the conduit pivotally mounted to a wall of the conduit near its upper edge so as to be pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the hood comprising a fixed deflector which is integral with the hood and non-parallel to the pivot axis of the hood for the purpose of directing the air in the direction of said deflector.

2. A conditioning air supply nozzle assembly comprising, an air supply conduit having an open outlet end, a substantially part-cylindrical hood, having a radius equal to one of the sides of the cross-section of the conduit pivotally mounted to a wall of the conduit near its upper edge so as to be pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the hood comprising a fixed deflector which is integral with the hood and oblique relative to the pivot axis of the hood for the purpose of directing the air in an oblique direction with respect to said axis.

3. A conditioning air supply nozzle assembly comprising, an air supply conduit having an open outlet end, a substantially part-cylindrical hood, having a radius equal to one of the sides of the cross-section of the conduit pivotally mounted to a wall of the conduit near its upper edge so as to be pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the hood comprising curved fins which are integral with the hood and substantially concentric with the hood relative to the pivot axis of the hood and in spaced relation to each other and to the hood.

4. A conditioning air supply nozzle assembly comprising, an air supply conduit having an open outlet end, a substantially part-cylindrical hood pivotally mounted in the end of the conduit and pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the hood comprising a plurality of fixed deflectors which are integral with the hood and oblique relative to the pivot axis of the hood for the purpose of directing the air in an oblique direction with respect to said axis, and arcuate fins which are integral with the hood and substantially coaxial with the hood relative to the pivot axis, the fins being in spaced relation to each other and to the hood whereby the air issuing from the conduit is divided into a plurality of streams by the deflectors and fins.

5. The combination of a motor vehicle dashboard and a conditioning air supply nozzle assembly comprising, an air supply conduit having an open outlet end, a substantially part-cylindrical hood, having a radius equal to one of the sides of the cross-section of the conduit pivotally mounted to a wall of the conduit near its upper edge so as to be pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the conduit outlet end being secured to the dashboard and the dashboard having an aperture through which the hood projects in said deployed position, the hood being substantially flush with the dashboard in said withdrawn position.

6. The combination of a motor vehicle dashboard and two conditioning air supply nozzle assemblies in adjacent relation to each other, each nozzle assembly comprising an air supply conduit having an open outlet end, a substantially part-cylindrical hood pivotally mounted in the end of the conduit and pivotally adjustable between a withdrawn position in which the hood is withdrawn into the conduit and a deployed position in which the hood projects from the conduit outlet end, whereby the direction of the air issuing from the conduit can be varied between two extreme directions making an angle therebetween determined by the pivotal adjustment of the hood, the hood comprising a fixed deflector which is integral with the hood and oblique relative to the pivot axis of the hood for the purpose of directing the air in an oblique direction with respect to said axis, and arcuate fins which are integral with the hood and substantially coaxial with the hood relative to the pivot axis, the fins being in spaced relation to each other and to the hood whereby the air issuing from the conduit is divided into a plurality of streams by the deflectors and fins the conduit outlet ends being secured to the dashboard and the dashboard having an apertured portion through which each hood projects in said deployed position, one nozzle assembly directing air toward the vehicle driver and the other nozzle assembly directing air toward the forward passenger of the vehicle.

7. The combination as claimed in claim 6, wherein the two hoods are in adjoining relation to each other and are pivotal about aligned pivot axes, the dashboard having a single aperture through which the hoods project in said deployed position.

References Cited by the Examiner

UNITED STATES PATENTS

| | | | |
|---|---|---|---|
| 2,656,781 | 10/1953 | Spieth | 98—40 |
| 2,759,411 | 8/1956 | Jenson | 98—40 |
| 2,788,955 | 4/1957 | Smith | 98—2.5 |
| 2,853,935 | 9/1958 | Crowle | 98—94 |
| 2,928,333 | 3/1960 | Madison | 98—40 |
| 3,103,155 | 9/1963 | Boylan | 98—40 |

MEYER PERLIN, *Primary Examiner.*